United States Patent
Ratnakaram et al.

(10) Patent No.: US 11,411,805 B1
(45) Date of Patent: Aug. 9, 2022

(54) SYSTEM AND METHOD FOR DETECTING ROOT CAUSE OF AN EXCEPTION ERROR IN A TASK FLOW IN A DISTRIBUTED NETWORK

(71) Applicant: Bank of America Corporation, Charlotte, NC (US)

(72) Inventors: Udaya Kumar Raju Ratnakaram, Hyderabad (IN); Amit Mishra, Chennai (IN); Krithika Viswanathan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/372,903

(22) Filed: Jul. 12, 2021

(51) Int. Cl.
*H04L 41/0631* (2022.01)
*H04L 43/12* (2022.01)
*H04L 41/0686* (2022.01)
*H04L 41/0604* (2022.01)

(52) U.S. Cl.
CPC ...... *H04L 41/0631* (2013.01); *H04L 41/0627* (2013.01); *H04L 41/0686* (2013.01); *H04L 43/12* (2013.01)

(58) Field of Classification Search
CPC ............. H04L 41/0627; H04L 41/0631; H04L 41/0686; H04L 43/12
USPC ....................................................... 709/224
See application file for complete search history.

(56) References Cited

U.S. PATENT DOCUMENTS

| | | | |
|---|---|---|---|
| 6,640,145 B2 | 10/2003 | Hoffberg et al. | |
| 6,732,111 B2 | 5/2004 | Brodersen et al. | |
| 6,747,957 B1* | 6/2004 | Pithawala | H04L 43/067 709/224 |
| 7,076,778 B2 | 7/2006 | Brodersen et al. | |
| 7,287,192 B1* | 10/2007 | Engel | G06F 11/0709 714/E11.026 |
| 7,685,083 B2 | 3/2010 | Fairweather | |
| 7,702,624 B2 | 4/2010 | King et al. | |
| 8,073,742 B2 | 12/2011 | Caballero et al. | |
| 8,073,777 B2 | 12/2011 | Barry et al. | |
| 8,172,682 B2 | 5/2012 | Acres et al. | |
| 8,209,738 B2 | 6/2012 | Nicol et al. | |
| 8,255,995 B2 | 8/2012 | Kraemer et al. | |
| 8,533,851 B2 | 9/2013 | Ginter et al. | |
| 8,635,376 B2 | 1/2014 | Barrett et al. | |
| 8,713,062 B2 | 4/2014 | Bobick et al. | |
| 8,713,631 B1 | 4/2014 | Pavlyushchik | |
| 8,788,569 B2 | 7/2014 | Griffiths et al. | |
| 8,793,363 B2 | 7/2014 | Sater et al. | |
| 8,826,077 B2 | 9/2014 | Bobak et al. | |

(Continued)

*Primary Examiner* — David P Zarka

(57) ABSTRACT

A system for detecting a root cause of an exception error in a task flow in a distributed network receives communication data exchanged among servers. The system determines whether each message is received by a respective server based on acknowledgement data that indicates whether each message is received by a respective server. The system determines the sequence of the messages communicated between the servers. The system determines that a first server has reported an exception error that indicated the first server did not receive a message from a second server. The system determines that the second server is associated with a root cause of the exception error in response to determining that the second server did not send the message to the first server.

17 Claims, 3 Drawing Sheets

(56) References Cited

U.S. PATENT DOCUMENTS

| | | |
|---|---|---|
| 8,843,386 B2 | 9/2014 | Greene et al. |
| 8,904,181 B1 | 12/2014 | Felsher et al. |
| 8,924,269 B2 | 12/2014 | Seubert et al. |
| 8,924,346 B2 | 12/2014 | Colrain et al. |
| 9,154,383 B2 | 10/2015 | Manuel-Devadoss et al. |
| 9,286,471 B2 | 3/2016 | Qureshi et al. |
| 9,294,386 B2 | 3/2016 | Narad |
| 9,298,535 B2 | 3/2016 | Haines |
| 9,477,749 B2 | 10/2016 | Mathew et al. |
| 9,514,387 B2 | 12/2016 | Eaton |
| 9,767,302 B2 | 9/2017 | Lim |
| 9,940,330 B2 | 4/2018 | Le et al. |
| 10,318,366 B2* | 6/2019 | Qi .................. G06F 11/079 |
| 10,333,798 B2 | 6/2019 | Chan et al. |
| 10,536,356 B2 | 1/2020 | Zhong et al. |
| 10,592,562 B2 | 3/2020 | Pal et al. |
| 10,621,068 B2 | 4/2020 | Kruszewski et al. |
| 10,621,203 B2 | 4/2020 | Hunt et al. |
| 10,681,060 B2 | 6/2020 | Scheidler et al. |
| 10,693,900 B2 | 6/2020 | Zadeh et al. |
| 10,810,071 B2 | 10/2020 | Hu et al. |
| 10,855,712 B2 | 12/2020 | Oliner et al. |
| 11,153,325 B1* | 10/2021 | Igolnik ............ H04L 67/1095 |
| 11,252,052 B1* | 2/2022 | Babu Balasubramani ................. H04L 41/0645 |
| 2004/0199627 A1* | 10/2004 | Frietsch ............ H04L 41/0677 709/224 |
| 2005/0201274 A1* | 9/2005 | Guerin ................ H04L 45/123 370/390 |
| 2010/0042744 A1* | 2/2010 | Rahman ................ H04L 69/40 709/239 |
| 2010/0100357 A1* | 4/2010 | Harper ............... G06F 11/3476 702/187 |
| 2015/0032500 A1 | 1/2015 | Cope et al. |
| 2015/0081559 A1 | 3/2015 | Dua |
| 2015/0193630 A1 | 7/2015 | Von Kaenel et al. |
| 2015/0281287 A1 | 10/2015 | Gill et al. |
| 2015/0339673 A1 | 11/2015 | Adjaoute |
| 2016/0055489 A1 | 2/2016 | Frankland et al. |
| 2016/0140743 A1 | 5/2016 | Neels et al. |
| 2016/0359914 A1* | 12/2016 | Deen .................... H04L 43/04 |
| 2017/0005887 A1* | 1/2017 | Lad ...................... H04L 43/045 |
| 2017/0091008 A1 | 3/2017 | Cherbakov et al. |
| 2017/0251985 A1 | 9/2017 | Howard |
| 2018/0089188 A1 | 3/2018 | Kharisma et al. |
| 2018/0246942 A1 | 8/2018 | Chen et al. |
| 2019/0052549 A1 | 2/2019 | Duggal et al. |
| 2019/0220776 A1* | 7/2019 | Huang ........... G01R 31/318342 |
| 2019/0223007 A1* | 7/2019 | Weaver .................. H04L 67/00 |
| 2019/0312775 A1* | 10/2019 | Patil ...................... H04L 41/085 |
| 2022/0103417 A1* | 3/2022 | Grammel ............ H04L 41/145 |

* cited by examiner

SYSTEM AND METHOD FOR DETECTING ROOT CAUSE OF AN EXCEPTION ERROR IN A TASK FLOW IN A DISTRIBUTED NETWORK

TECHNICAL FIELD

The present disclosure relates generally to data processing, and more specifically to a system and method for detecting root cause of an exception error in a task flow in a distributed network.

BACKGROUND

System stability testing and diagnosis in a distributed network of computing devices is a challenging problem. Computing devices in a distributed network can fail due to many possible causes. It is challenging to detect a cause of a failure in the distributed network. Currently, in case of a failure, the computing devices in the distributed network undergo manual inspection by operators. This process is time-consuming and error-prone. Current technology is not configured to provide a reliable and efficient solution to detect the root cause of an exception error reported by a device in a distributed network.

SUMMARY

Current technology is not configured to provide a reliable and efficient solution to detect the root cause of an exception error reported by a device in a distributed network. This disclosure contemplates systems and methods for detecting the root cause of an exception error in a task flow in a distributed network.

For example, assume that a user wants to access their account from a web application. To enable the user to access their account, a series of steps may be performed by a series of servers in the distributed network. The distributed network may include a first server that may be configured to verify user login credentials to enable the user to enter their user portal on the web application, a second server that may be configured to retrieve user information to be displayed on the user's portal, a third server that may be configured to store the user information, and other servers. The other servers may perform other steps to enable the user to access their account and view their information. In the distributed network, a plurality of servers may communicate with each other and exchange messages to enable the user to access their account, and view their information. In some cases, a server may not receive a message as expected. For example, assume that a first server may send a message to a second server to retrieve particular user information, e.g., a residential address, a phone number, a document, etc. Also, assume that the second server does not respond to the received message. In this example, the first server reports an exception error because the first server does not receive the requested user information as expected from the second server. The disclosed system is configured to detect the root cause of such exception errors. Accordingly, the disclosed system provides a practical application of detecting the root cause of exception errors in a distributed network.

In one embodiment, the system for detecting a root cause of an exception error in a distributed network comprises a processor and a memory. The processor receives communication data that comprises a plurality of messages being transmitted between a plurality of servers in a distributed network, where the plurality of servers comprises a first server, a second server, and a third server. The processor receives communication acknowledgement data that indicates whether each message from among the plurality of messages is being received by a respective server from among the plurality of servers. The communication acknowledgement data comprises a first acknowledgement data that indicates whether the second server received a first message from the first server, and a second acknowledgement data that indicates whether the second server received a second message from the third server. The processor determines whether each message from among the plurality of messages is received by a respective server from among the plurality of servers based at least in part upon the communication acknowledgement data. The processor determines, from the first acknowledgement data, that the second server has received the first message from the first server. The processor determines, from the second acknowledgement data, that the second server has reported an exception error that indicates that the second server did not receive the second message from the third server, and that the third server did not send the second message to the second server. The processor determines that the third server is associated with the root cause of the exception error in response to determining that the third server did not send the second message to the second server. The memory is operably coupled with the processor. The memory is operable to store the communication data and the communication acknowledgement data.

The disclosed system provides several practical applications and technical advantages, which include: 1) technology that detects a server that reports an exception error by implementing an exception monitoring module in each server from among a plurality of servers in a distributed network, and implementing an exception listener module in a central server that is configured to receive communications exchanged between the plurality of servers; 2) technology that identifies servers that are in direct communication with the server that reported the exception error, e.g., by implementing a multi-layer detection module; 3) technology that determines the health of communications among the servers, i.e., determines whether each message transmitted between each pair of servers is successfully received or failed, e.g., based on acknowledgement messages that indicate whether each message is received or not; 4) technology that generates a communication matrix whose elements indicate successful and failed messages between the servers, where the successful messages are indicated by logic number "1" and the failed messages are indicated by logic number "0"; 5) technology that, using the communication matrix, identifies the earliest failed message based on determining the sequence associated with the messages and the acknowledgement messages exchanged between the servers; 6) and technology that determines that the root cause of the exception error is associated with the server that is associated with the earliest failed message.

As such, the disclosed system may improve the current data processing, distributed system monitoring, and fault detection technologies by detecting a root cause of an exception error in a task flow in a distributed system. Accordingly, the disclosed system may be integrated into a practical application of improving processing and memory storage capacity utilization for detecting the root cause of the exception error that would otherwise be spent using the current technology. For example, by detecting the root cause of the exception error, the disclosed system may report the root cause to an operator, and the root cause that has led to the exception error can be addressed and perhaps resolved.

The disclosed system may further be integrated into an additional practical application of improving the underlying operations of computer systems in the distributed network (e.g., servers, databases, etc.) that are tasked to carry out steps to grant a user request, such as to access an account and retrieve particular information from the account. For example, using the current technology where the root cause of the exception error has remained undetected, the computer systems in the distributed network continue to communicate with other computer systems which lead to more failed messages reported by the computer systems. This leads the processors and memories of the computer systems to have to process multiple failed messages, which leads to reducing the efficiency of utilizing the processing resources and storage capacity of these computer systems. In contrast, upon detecting the earliest failed message, the disclosed system processes the earliest failed message and detects a root cause of the earliest failed message. Upon detecting the earliest failed message, the disclosed system may pause the undergoing task flow, thus, preventing other servers to report failed messages as a consequence of the earliest failed message. Accordingly, the disclosed system improves the processing resources and storage capacity utilization in the computer systems of the distributed network more efficiently.

The disclosed system may further be integrated into an additional practical application of improving network communication between the computer systems of the distributed network. For example, by detecting the root cause of the exception error, and reporting the root cause of the exception error, the root cause can be addressed earlier compared to the current technology, and thus, the network communication bandwidth among the computer systems is not wasted.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect a root cause of an exception error in a task flow in a distributed network. This disclosure provides various systems and methods to detect a root cause of an exception error in a task flow in a distributed network. In one embodiment, system 100 to detect a root cause of an exception error in a task flow in a distributed network are described in FIG. 1. In one embodiment, operational flow 200 of the system 100 to detect a root cause of an exception error in a task flow in a distributed network are described in FIG. 2. In one embodiment, method 300 to detect a root cause of an exception error in a task flow in a distributed network are described in FIG. 3.

Figure 1:
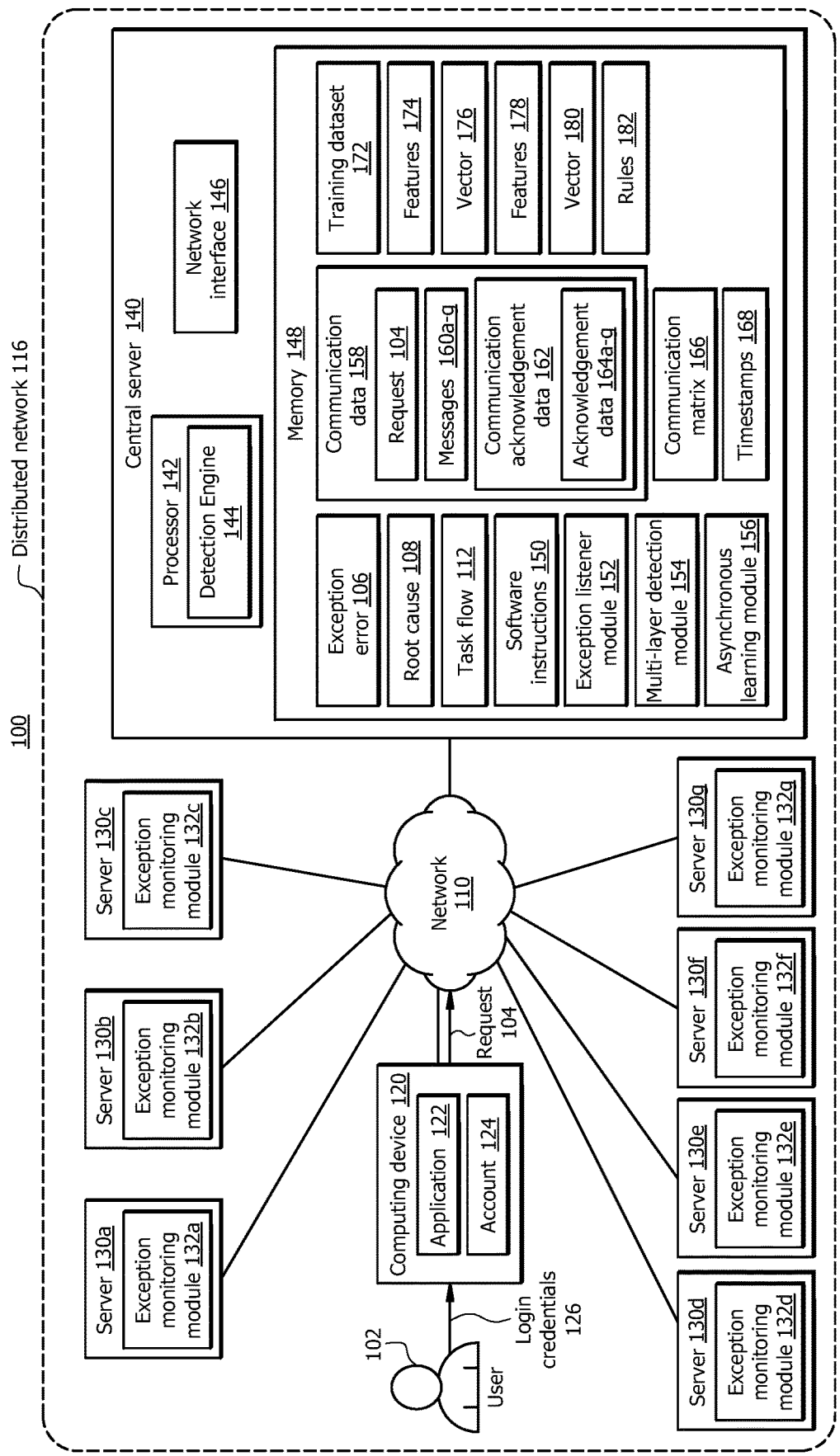
FIG. 1 illustrates an embodiment of a system configured to detect a root cause of an exception error in a task flow in a distributed network.

Example System for Detecting a Root Cause of an Exception Error in a Task Flow in a Distributed Network FIG. 1 illustrates one embodiment of a system 100 that is configured for detecting a root cause 108 of an exception error 106 in a task flow 112 in a distributed network 116. In one embodiment, system 100 comprises a central server 140. In some embodiments, system 100 further comprises a network 110, computing device 120, and one or more servers 130. Network 110 enables the communication between components of the system 100. Central server 140 comprises a processor 142 in signal communication with a memory 148. Memory 148 stores software instructions 150 that when executed by the processor 142, cause the processor 142 to execute one or more functions described herein. For example, when the software instructions 150 are executed, the processor 142 executes a detection engine 144 to detect an exception error 106 in a task flow 112, and detect a root cause 108 of the exception error 106. In other embodiments, system 100 may not have all of the components listed and/or may have other elements instead of, or in addition to, those listed above.

System Components

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120.

Application 122 can be accessed from the computing device 12. The computing device 120 stores and/or comprises the application 122. The application 122 may be a software, mobile, or web application 122. The user 120 can access the application 122 from a screen of the computing device 120. For example, the application 122 may be associated with an organization that provides services and/or products to users 102. The user 102 may use the application 122 to log into their account 124, access their account 124, view their account information, etc.

The process of enabling the user 102 to access and/or view their account information may be referred to as the task flow 112. To enable the user 102 to access their account 124, one or more steps may be performed by one or more servers 130 in the distributed network 116. This process is described further below in conjunction with the operational flow 200 described in FIG. 2.

Each of the servers 130a to 130g is generally any device that is configured to process data and/or store data used by one or more components of the system 100. Each of the servers 130a to 130g may be a different server 130. In some examples, each of the servers 130a to 130g may include a computer system, such as a desktop computer, a workstation, a computing system, and/or the like. In some examples, each of the servers 130a to 130g may include a database or a storage architecture, such as a network-attached storage cloud, a storage area network, a storage assembly, computer storage disk, computer memory unit, computer-readable non-transitory storage media directly (or indirectly) coupled to one or more components of the system 100. The servers 130a-g may form a distributed network or network 116. Other servers 130 may be included in the distributed network 116.

Each of the servers 130a to 130g may include a user interface, such as a display, a microphone, keypad, or other appropriate terminal equipment usable by a user. Each of the servers 130a to 130g may include a hardware processor, memory, and/or circuitry configured to perform any of the functions or actions of each of the servers 130a to 130g described herein. For example, a different software application designed using software code may be stored in the memory and executed by the processor to perform the functions of each of the servers 130a to 130g.

In a complex task flow 112, various messages may be exchanged among the servers 130. To monitor the messages (i.e., communications) transmitted among the servers 130, an exception monitoring module 132 may be installed in each of the servers 130a to 130g. Thus, the communications transmitted among the servers 130 are monitored by exception monitoring modules 132.

The exception monitoring module 132 installed in a particular server 130 may be implemented by a processor of the particular server 130 executing software instructions stored in a memory of the particular server 130. The exception monitoring module 132 is configured to monitor the incoming and outgoing communications of the server 130. The exception monitoring modules 132a to 132g are instances of the exception monitoring module 132.

In the example of FIG. 1, the exception monitoring module 132a is installed in the server 130a, exception monitoring module 132b is installed in the server 132b, exception monitoring module 132c is installed in the server 132c, exception monitoring module 132d is installed in the server 132d, exception monitoring module 132e is installed in the server 132e, the exception monitoring module 132f is installed in the server 130f, and exception monitoring module 132g is installed in the server 132g. The distributed network 116 may include other servers 130. Thus, any number of servers 130 may include exception monitoring modules 132 in the distributed network 116.

In an example operation, assume that the user 102 wants to access their account 124. To this end, the user 102 may input their login credentials 126 in the application 122. In response, the application 122 sends a request 104 to the server 130a to verify the login credentials 126. The server 130a may include a middleware system that is configured to verify the login credentials 126. The server 130a may verify the login credentials 126 by determining whether the login credentials 126 match login credentials previously set by the user 102, and stored in a memory of the server 130a. In response to verifying the login credentials 126, the server 130a sends a first message 160 to the server 130b that indicates the login credentials 126 are valid.

In response to receiving the first message 160, the server 130b may allow the user 102 to enter their account portal on the application 122. The server 130b may include a User Interface (UI) application module that allows the user 102 to enter their account portal on the application 122. Now that the user 102 has been allowed to log into their account 124, assume that the user 102 wants to view particular account information, such as a file that they stored in their account 124 last month, residential address, phone number, and/or any other user information available on the account 124. To this end, the server 130b sends a second message 160 to the server 130c to retrieve the requested user information from servers 130d and 130e.

In response, the server 130c sends a third message 160 to the servers 130d and 130e to retrieve the requested user information. The server 130c may include a middleware system that is configured to retrieve user information from one or more servers 130. The server 130d may include a database that is configured to store a first set of user information. Similarly, server 130e may include a database that is configured to store a second set of user information.

At every step in this process, the exception monitoring modules 132a to 132e monitor and record the messages 160 being exchanged between the servers 130a to 130e. The exception monitoring modules 132a to 132e forward the recorded messages 160 to the exception listener module 152 that is stored in the memory 148 of central server 140. In some embodiments, the exception monitoring modules 132a to 132e may forward the messages 160 to the central server 140 in real-time, periodically (e.g., every minute, every two minutes, etc.), and/or on-demand.

Assume that the third message 160 is not received successfully by the server 130d. Thus, the server 130d reports an exception error 106 that indicates the third message 160 is not received. Thus, the detection engine 144 is triggered to detect the root cause 108 of the exception error 106. The detection engine 144 uses the communication data 158 that includes the request 104 and messages 160 to detect the root cause 108 of the exception error 106. This process is described in detail in conjunction with the operational flow 200 described in FIG. 2.

Central Server

Central server 140 is generally a server or any other device configured to process data and communicate with computing devices (e.g., computing device 120 and servers 130), databases, etc., via the network 110. The central server 140 is generally configured to oversee the operations of the detection engine 144, as described further below in conjunction with the operational flow 200 of system 100 described in FIG. 2.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the detection engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of method 300 as described in FIG. 3.

Network interface 146 is configured to enable wired and/or wireless communications (e.g., via network 110). The network interface 146 is configured to communicate data between the server 140 and other devices (e.g., computing device 120 and servers 130), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the software instructions 150, exception listener module 152, multi-layer detection module 154, asynchronous learning module 156, communication data 158, exception error 106, root cause 108 (of the exception error 106), task flow 112, communication matrix 166, timestamps 168, training dataset 172, features 174, features 178, vector 176, vector 180, and/or any other data or instructions. The software instructions 150 may comprise any suitable set of instructions, logic, rules, or code operable to execute the processor 142.

Detection Engine

Detection engine 144 may be implemented by the processor 142 executing the software instructions 150, and is generally configured to detect a root cause 108 of an exception error 106 in a task flow 112 in the distributed network 116.

In one embodiment, the detection engine 144 detects the root cause 108 of an exception error 106 in a task flow 112 by executing the exception listener module 152 and multi-layer detection module 154.

In one embodiment, the detection engine 144 detects the root cause 108 of an exception error 106 in a task flow 112 by executing the asynchronous learning module 156.

The operations of the detection engine 144 is described below in conjunction with the operational flow 200 of the system 100 described in FIG. 1.

Figure 2:
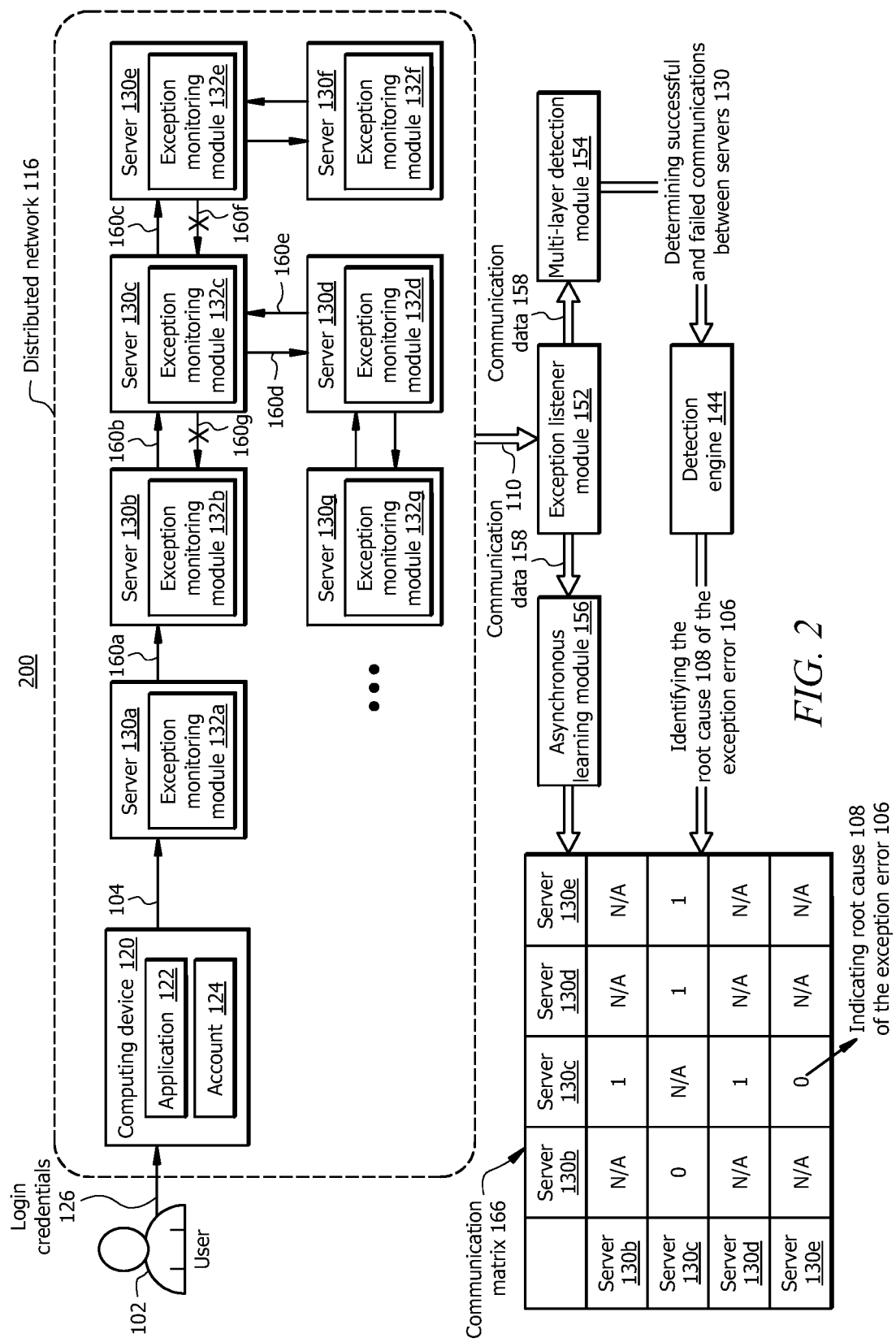
FIG. 2 illustrates an example operational flow of the system of FIG. 1 to detect a root cause of an exception error in a task flow in a distributed network.

Example Operational Flow for Detecting a Root Cause of an Exception Error in a Task Flow FIG. 2 illustrates an example operational flow 200 of system 100 of FIG. 1 for detecting a root cause 108 of an exception error 106 in a task flow 112.

In one embodiment, the operational flow 200 begins when the user 102 requests to login to their account 124, access their account 124, perform an action on their account 124, or any other task on the application 122. To enable the user 102 to perform a task on the application 122, one or more steps may be performed by one or more servers 130 in the distributed network 116.

In the example of FIG. 2, assume that the task is to allow the user 102 to login to their account 124, and access a particular data associated with the account 124. The one or more steps that the servers 130 perform to enable the user 102 to login to their account 124, and access the particular data may be referred to as the task flow 112. In the example of FIG. 2, the task flow 112 is to enable the user 102 to login to their account 124, and access the particular data. In another example, the task flow 112 may be to enable the user 102 to perform any task on the application 122.

The user 102 inputs their login credential 126 to the application 122 similar to that described in FIG. 1. In response to receiving the login credentials 126, the application 122 sends the request 104 to the server 130a to verify the login credentials 126 of the user 102. If the server 130a verifies the login credentials 126 (similar to that described in FIG. 1), the server 130a sends the message 160a to the server 130b to allow the user 102 to log into the their account 124, similar to that described in FIG. 1. For example, the user 102 may be able to access their account portal on the application 122, and view their account 124 on the screen of the computing device 120. For example, assume that the user 102 wants to access particular information from their account 124, such as a file that they stored in their account 124 last month, residential address, phone number, and/or any other user information available on the account 124. To this end, the server 130b sends a message 160b to the server 130c to retrieve the requested user information from servers 130e and 130d, assuming that a first set of requested user information is stored in server 130e, and a second set of requested user information is stored in server 130d. In response, the server 130c sends a message 160c to the server 130e, and a message 160d to the server 130d to retrieve the requested user information. Assume that the server 130c retrieves the second set of requested information from the server 130d in a message 160e. Also, assume that the server 130c does not receive the first set of requested information from the server 130e. For example, assume that the server 130c does not receive the message 160f from the server 130e. Consequently, server 130c does not send a message 160g to the server 130b, because the server 130c did not receive the requested information from the server 130e. In parallel or in sequence, to enable the user 102 to retrieve the particular data from their account 124, any combination of servers 130 may communicate messages 160 to one another. For example, server 130f and 130g may send and receive messages 160 to and from servers 130e and 130d, respectively.

Accessing Communication Data Communicated Among the Servers

As described in FIG. 1, each of the servers 130a to 130g stores or associated with an instance of the exception monitoring module 132. Each exception monitoring module 132 forwards incoming and outgoing messages 160 with respect to its corresponding server 130 to the exception listener module 152 via the network 110.

In the example of FIG. 2, the exception monitoring module 132a forwards the message 160a, the exception monitoring module 132b forwards the message 160b, the exception monitoring module 132c forwards the messages 160*b* and 160*c*, the exception monitoring module 132*d* forwards the messages 160*d* and 160*e*, the exception monitoring module 132*e* forwards the message 160*c* to the exception listener module 152.

Each exception monitoring module 132 also forwards acknowledgement data 164 to the exception monitoring module 152. Each acknowledgement data 164 indicates whether a server 130 received a message 160 from another server 130. In the example of FIG. 2, the server 130*c* sends a first acknowledgement data 164*a* (see FIG. 1) that indicates the server 130*c* received the message 160*b* from the server 130*d*, and sends a second acknowledgement data 164*b* (see FIG. 1) that indicates the server 130*c* did not receive the message 160*f* from server 130*e* to the originating server 130 and/or the central server 140. Each of the other servers 130 may send other acknowledgement data 164 (e.g., acknowledgement data 164*c-g*) to a corresponding originating server 130 (that sends a message 160) and/or the central server 140.

In the example of FIG. 2, since the server 130*c* did not receive any message 160 from the server 130*e* as expected, the server 130*c* reports the exception error 106. The exception monitoring module 132*c* detects the exception error 106, and forwards it to the exception listener module 152. In this manner, the exception monitoring modules 132*a* to 132*g* send the messages 160*a-g*, the communication acknowledgement data 162, and the request 104 to the exception listener module 152.

The communication acknowledgement data 162 includes the acknowledgement data 164*a-g*. Each of the acknowledgement data 164*a-g* may be represented by a login number "1" or "0." The exception listener module 152 and/or the detection engine 144 stores the messages 160*a-g*, the communication acknowledgement data 162, and the request 104 in the communication data 158.

Determining Whether an Exception Error is Reported by a Server

The exception listener module 152 may include code that is configured to collect the communication data 158 and/or any other data, and determine whether an exception error 108 is included in the communication data 158 based on the communication acknowledgement data 162. The detection engine 144 executes the exception listener module 152 by executing the software instructions 150.

The exception listener module 152 forwards the communication data 158 to the multi-layer detection module 154 and the asynchronous learning module 156. The process of detecting the root cause 108 of the exception error 106 by the asynchronous learning module 156 is described further below.

The detection engine 144 executes the multi-layer detection module 154 by executing the software instructions 150. The multi-layer detection module 154 includes code that is configured to 1) identify servers 130 that are interacting with the server 130*c* that reported the exception error 106; and 2) determine the health of the communications among the server 130*c* and the surrounding servers 130 that the server 130*c* (that reported the exception error 106) is interacting, as described below.

In the example of FIG. 2, the multi-layer detection module 154 identifies that the server 130*c* has reported the exception error 106, and the server 130*c* is interacting with the servers 130*b*, 130*d*, and 130*e*. The multi-layer detection module 154 determines the health of the communication among the server 130*c* and its surrounding servers 130*b*, 130*d*, and 130*e*. To this end, the multi-layer detection module 154 executes query statements to identify successful and failed communication (or messages 160) among the servers 130*c*, 130*b*, 130*d*, and 130*e*.

For example, to identify the successful communications between the server 130*c* and 130*b*, the multi-layer detection module 154 searches logs that comprise the communication data 158, messages 160 and acknowledgement data 162 exchanged between the server 130*c* and 130*b*. For example, to determine whether communications from the server 130*b* to 130*c* are successful, the multi-layer detection module 154 executes a query statement, such as "search from logs where server="server 130*b*" && matchstring="server 130*b* to server 130*c* integration success." Since in the example of FIG. 2, the message 160*b* from the server 130*b* to 130*c* is received (as indicated in the communication acknowledgement data 162), the result of this query statement is indicated by login "1" or "true." In other words, the result of this query statement and/or corresponding acknowledgement data 164 indicates that the message 160*b* was successfully received by the server 130*c*.

In another example, to determine whether communications from the server 130*c* to 130*b* are successful, the multi-layer detection module 154 executes a query statement, such as "search from logs where server="server 130*b*" && matchstring="server 130*c* to server 130*b* integration success." Since in the example of FIG. 2, the communication from the server 130*c* to 130*b* is not received (as indicated in the communication acknowledgement data 162), the result of this query statement is indicated by login "0" or "false." In other words, the result of this query statement and/or corresponding acknowledgement data 164 indicates that the message 160*g* was never sent by the server 130*c*.

In another example, to determine whether communications from the server 130*e* to and 130*c* are successful, the multi-layer detection module 154 executes a query statement, such as "search from logs where server="server 130*e*" && matchstring="server 130*e* to server 130*c* integration success." Since in the example of FIG. 2, the communication from the server 130*e* to 130*c* is not received (as indicated in the communication acknowledgement data 162), the result of this query statement is indicated by login "0" or "false." In other words, the result of this query statement and/or corresponding acknowledgement data 164 indicates that the message 160*f* was never sent by the server 130*e*.

In a similar manner, the multi-layer detection module 154 identifies successful and failed communications among the servers 130*a-g*.

Generating a Communication Matrix

The multi-layer detection module 154 forwards this information, i.e., result of the query statements to the detection engine 144. The detection engine 144 generates the communication matrix 166 using the received data from the multi-layer detection module 152.

The communication matrix 166 includes indications that specify the successful and failed communications among the servers 130. In the communication matrix 166, "1" indicates a successful communication, "0" indicates a failed communication, and "NA" indicates Non-Applicable communication.

In the example of the first row of the communication matrix 166, the first row indicates the communications from the server 130*b* to servers 130*c* to 130*e*. The first row of the communication matrix 166 indicates that the server 130*b* sends a message 160 to the server 130*c* successfully, as indicated by "1." In the example of the second row of the communication matrix 166, the second row indicates that the server 130*c* did not send a message 160 to the server 130*b* (as indicated by "0") and that the server 130*c* sent messages 160 to the servers 130*d* and 130*e* (as indicated by "1"). In other words, the second row indicates that the communication from the server 130*c* to server 130*b* failed. In the example of the third row of the communication matrix 166, the third row indicates that the server 130*d* sends a message 160 to the server 130*c* successfully, as indicated by "1." In the example of the fourth row of the communication matrix 166, the fourth row indicates that the communication from the server 130*e* to the server 130*c* failed, as indicated by "0."

The detection engine 144 determines a timestamp 168 associated with each communication including messages 160 and communication acknowledgement data 162 transmitted between the servers 130. The detection engine 144 determines, from the communication matrix 166 and the timestamps 168 of the messages 160 and communication acknowledgement data 162, the sequence and order of the communications transmitted between the server 130.

In the example of FIG. 2, the detection engine 144 determines that the server 130*c* is supposed to receive the message 160*f* from the server 130*e*, before sending the message 160*g* to the server 130*b*. In other words, the detection engine 144 determines that the timestamps 168 of failed communications (as indicated by "0" in the communication matrix 166), and determines that the first timestamp 168 of the failed communication from the server 130*e* to server 130*c* is before (or recorded before) the second timestamp 168 of the failed communication from the server 130*c* to server 130*b*.

Identifying the Root Cause of the Exception Error

The detection engine 144 determines the root cause 108 of the exception error 106 by identifying the earliest failed communication (or failed message 160) and its originating server 130. To this end, the detection engine 144 may be implemented by an object-oriented programming language, and treat each element of the communication matrix 166 as an object. The detection engine 144 may also treat each element of the communication data 158 and timestamps 168 as objects. The detection engine 144 determines the correlations and associations between the elements of the communication matrix 166, communication data 158, and timestamps 168. The detection engine 144 uses this information to identify the root cause 108 of the exception error 106.

In the example of FIG. 2, the detection engine 144 determines that communications that were supposed to originate from servers 130*c* and 130*e* failed. Based on the timestamps 168 of the communications between the servers 130 and the communication matrix 166, the detection engine 144 determines that the communication that was supposed to originate from the server 130*e* failed before the communication originated from the server 130*c*. In this example, the detection engine 144 determines that the server 130*c* is not a root cause 108 of the exception error 106, for example, because the communications between the server 130*c* and server 130*d* are successful as indicated by "1" in the communication matrix 166, and there is at least one communication (i.e., from the server 130*e* to server 130*c*) that failed before the communication between the server 130*c* and server 130*b*.

The detection engine 144 determines that the root cause 108 of the exception error 108 is the server 130*e* because the failed communication that was supposed to originate from the server 130*e* is the earliest failed communication, and has led to failure in one or more communications or failures in delivering messages 160.

In the example of FIG. 2, the detection engine 144 determines that the root cause 108 of the exception error 108 is the server 130*e* even though the server 130*c* reported the exception error 108.

The detection engine 144 may determine that the server 130*e* is the root cause 108 of the exception error 108, due to a failure in the server 130*e*, the server 130*e* being shut down, an error in network communication between the server 130*e* and other servers 130, etc.

In one embodiment, the server 130*b* may also report a second exception error 108 because the server 130*b* did not receive the message 160*g* as expected according to the example task flow 112 of the operational flow 200. Thus, the detection engine 144, exception listener module 152, and/or the multi-layer detection module 154 may detect the second exception error 108 in addition to the first exception error 108 described above. The detection engine 144 may determine that the cause of the server 130*b* reporting the second exception error 108 is that the server 130*c* did not send the message 160*g* to the server 130*d*. The detection engine 144 may determine, based on the communication matrix 166, communication data 158, and timestamps 168, that the second exception error 108 is reported after the first exception error 108. Thus, the root cause 108 of the first exception error 108 is the same root cause 108 of the second exception error 108.

In one example, an exception error 106 may be due to a server 130 not sending a message 160 as expected according to the task flow 112, e.g., because of a failure in the sending server 130. In another example, an exception error 106 may be due to a server 130 not receiving a message 160 as expected according to the task flow 112, e.g., because of a failure in the receiving server 130. In another example, an exception error 106 may be due to a failure in network communication between servers 130. In the example of FIG. 2, the detection engine 144 may determine that the network communication between the servers 130*b*, 130*c*, 130*d*, 130*e*, and 130*f* is operational because these servers 130*b-f* can transmit other messages 160, e.g., 160*b*, 160*c*, 160*d*, and 160*e* to one another.

In this manner, the detection engine 144 may be configured to detect the root cause 108 of a chain or series of related exception errors 106.

Identifying the Root Cause of the Exception Error Based on a Pattern of the Communication Matrix As described above, the exception listener module 152 forwards the communication data 158 to the asynchronous learning module 156. The detection engine 144 may execute the asynchronous learning module 156 to learn the pattern of the communication data 158, as described below.

The detection engine 144 may execute the asynchronous learning module 156 by executing the software instructions 150. The detection engine 144 may execute the asynchronous learning module 156 in parallel or after one or more other software modules described above, e.g., multi-layer detection module 154. The asynchronous learning module 156 may be implemented by a machine learning algorithm. For example, the asynchronous learning module 156 may comprise support vector machine, neural network, random forest, k-means clustering, etc. The asynchronous learning module 156 may be implemented by a plurality of neural network (NN) layers, Convolutional NN (CNN) layers, Long-Short-Term-Memory (LSTM) layers, Bi-directional LSTM layers, Recurrent NN (RNN) layers, and the like. In another example, the asynchronous learning module 156 may be implemented by Natural Language Processing (NLP). In another example, the asynchronous learning module 156 may be implemented by data feed processing, where the data may be in a form of text, code, among others. The detection engine 144 and/or the asynchronous learning module 156 uses the generated communication matrix 166, communication data 158, and timestamps 168 as a training dataset 172.

In a training process, the detection engine 144 and/or the asynchronous learning module 156 may feed the communication matrix 166, communication data 158, and timestamps 168 to an NLP algorithm to determine the associations and correlations between the components of the communication matrix 166, communication data 158, and timestamps 168. In this operation, the detection engine 144 and/or the asynchronous learning module 156 extract features 174 of the communication matrix 166, communication data 158, and timestamps 168. The features 174 may be represented by a vector 176 that comprises a set of numerical values.

The detection engine 144 and/or the asynchronous learning module 156 uses the features 174 and vector 176 to predict a root cause 108 of another exception error 106 that is reported by a server 130 during another task flow 112. For example, assume that the same or another user 102 wants to access their account 124 at another time. A similar process as described above with respect to performing one or more steps is carried out by the servers 130, and the exception monitoring modules 132 forward a second set of communication data 158 to the exception listener module 152. Also assume that a second exception error 108 is reported by a server 130, as indicated in the second set of communication data 158.

The detection engine 144 and/or the asynchronous learning module 156 extract features 178 from the second set of communication data 158, timestamps 168 associated with the second set of communication data 158. The features 178 may be represented by a vector 180 that comprises a set of numerical values.

The detection engine 144 and/or the asynchronous learning module 156 compares the vector 176 (from the training dataset 172) with the vector 180. In this process, the detection engine 144 and/or the asynchronous learning module 156 compares the reference data (i.e., vector 180 that represents the first set of communication data 158, timestamps 168, and communication matrix 166) labelled with the root cause 108 and exception error 106 with the incoming data (i.e., vector 176 that represents the second set of communication data 158 and timestamps 168) that is not labelled with a root cause 108 or an exception error 106.

In comparing the vector 176 with vector 180, the detection engine 144 and/or the asynchronous learning module 156 determines a similarity score between these vectors 176 and 180. For example, to determine the similarity score between the vectors 176 and 180, the detection engine 144 and/or the asynchronous learning module 156 may calculate a dot product of the vectors 176 and 180, calculate a Euclidean distance between the vectors 176 and 180, and/or the like.

The detection engine 144 and/or the asynchronous learning module 156 determines that the vector 176 corresponds to the vector 180 if more than a threshold number of numerical values of the vector 176 (e.g., more than 80%, 85%, etc.) is within a threshold range (e.g., ±5%, ±10%, etc.) of counterpart numerical values of the vector 180, and thus, the similarity score between the vectors 176 and 180 is more than a threshold percentage (e.g., more than 80%, 85%, etc.). If the detection engine 144 and/or the asynchronous learning module 156 determines that the vector 176 corresponds to the vector 180, the detection engine 144 and/or the asynchronous learning module 156 predicts that the root cause 108 of the second exception error 106 is the same root cause 108 that is indicated in the reference data, i.e., training dataset 172, as identified in the example operational flow 200. Otherwise, the detection engine 144 may determine the root cause 108 of the second exception error 106 by implementing the multi-layer detection module 154, and generating a second communication matrix 166, similar to that described above.

In this manner, the detection engine 144 and/or the asynchronous learning module 156 may add different scenarios of different task flows 112, different communication data 158, and timestamps 168 to the training dataset 172 and grow the training dataset 172.

In a testing process, the detection engine 144 and/or the asynchronous learning module 156 may be given a new set of communication data 158 and asked to predict whether an exception error 106 is indicated in the new set of communication data 158, and if so, predict the root cause 108 of the exception error 106.

The detection engine 144 and/or the asynchronous learning module 156 may feed the new set of communication data 158 and its timestamps 168 to the NLP algorithm, extract its features, and produce a vector that represents the features.

The detection engine 144 and/or the asynchronous learning module 156 may perform vector comparison between the newly produced vector and each of the vectors associated with the reference data stored in the training dataset 172, similar to that described above.

The detection engine 144 and/or the asynchronous learning module 156 determines that the root cause 108 of the exception error 106 is the same as the root cause 108 associated with a particular reference data in the training dataset 172, if the detection engine 144 and/or the asynchronous learning module 156 determines the vector similarity score between their vectors is more than a threshold percentage, e.g., more than 80%, 85%, etc.

In another embodiment, the detection engine 144 and/or the asynchronous learning module 156 may identify a root cause 108 of an exception error 106 based on a set of rules 182 that the detection engine 144 and/or the asynchronous learning module 156 generates during generating the communication matrix 166 and identifying the root cause 108 of the exception error 106.

The rules 182 may indicate to identify the failed communications between the servers 130, determine timestamps 168 of the failed communications, and identify that the root cause 108 of the exception error 106 is the originating server 130 associated with the earliest failed communication (e.g., failed message 160) recorded by an exception monitoring module 132.

In this rule-based approach, each of the components of the reference data (e.g., the training dataset 172, historical communication data 158, historical timestamps 168, and other historical data) and the incoming data (i.e., communication data 158, timestamps 168, and other new data) is treated as an object. The detection engine 144 and/or the asynchronous learning module 156 may then compare a value or content of each of the components of the reference data with a counterpart element of the incoming data.

The detection engine 144 and/or the asynchronous learning module 156 may identify that the new root cause 108 of the new exception error 106 is the same as the root cause 108 of the exception error 106 that is indicated in the training dataset 172 if more than a threshold number of elements of the reference data (i.e., the training dataset 172) is the same or within the threshold range of the counterpart element of the incoming data (i.e., communication data 158, timestamps 168, etc.).

In one embodiment, the detection engine 144, upon receiving the exception error 106 and detecting the earliest failed message 160, may pause the undergoing task flow 112, thus, preventing other servers 130 to report failed messages 160 as a consequence of the earliest failed message 160.

In one embodiment, the detection engine 144, upon receiving the first exception error 106 and detecting the earliest failed message 160, may allow the undergoing task flow 112 to continue, and in case another exception error 106 is reported by the same or another server 130, determine the correlation between two or more exception errors 106 and failed messages 160 by processing the communication data 158, timestamps 168, and communication matrix 166, similar to that described above.

Figure 3:
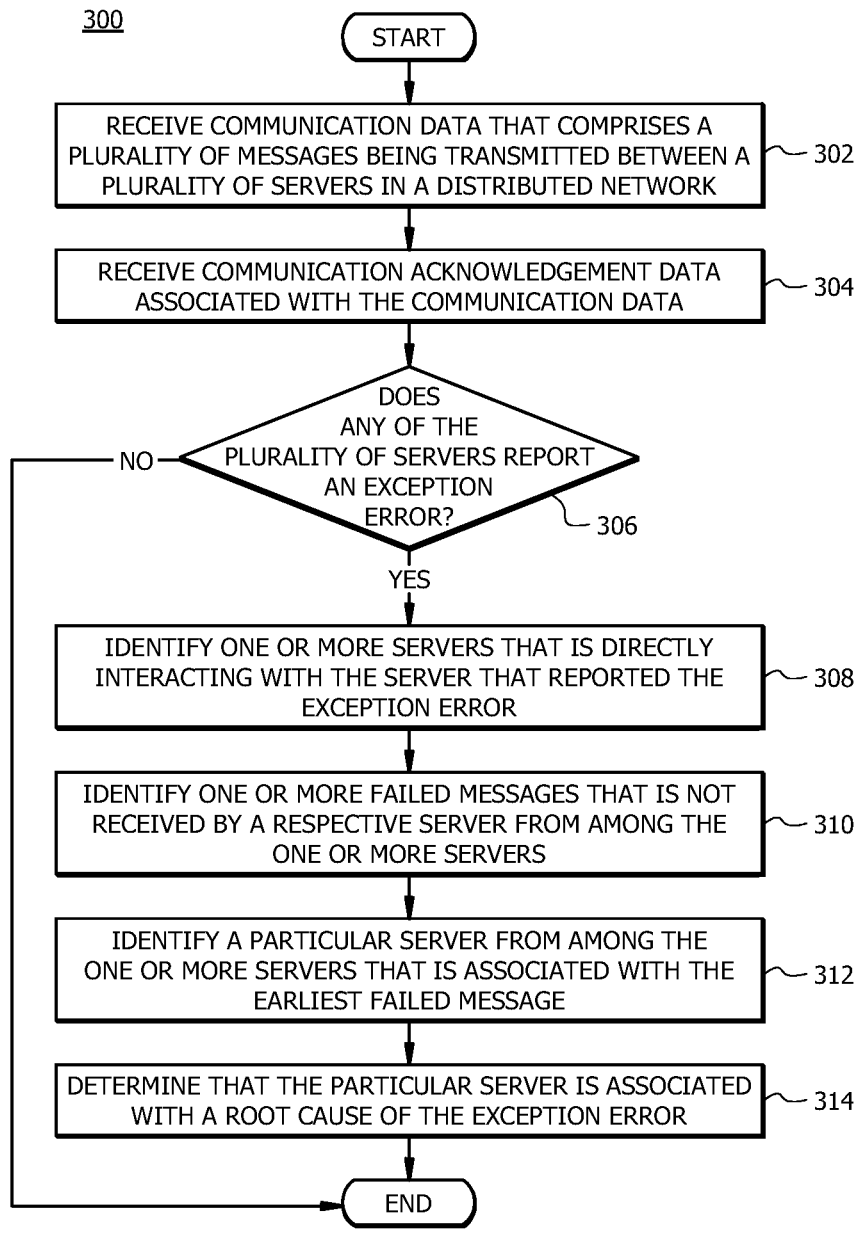
FIG. 3 illustrates an example flowchart of a method to detect a root cause of an exception error in a task flow in a distributed network.

Example Method for Detecting a Root Cause of an Exception Error in a Task Flow in a Distributed Network FIG. 3 illustrates an example flowchart of a method 300 for detecting a root cause 108 of an exception error 106 in a task flow 112 in a distributed network 116. Modifications, additions, or omissions may be made to method 300. Method 300 may include more, fewer, or other steps. For example, steps may be performed in parallel or in any suitable order. While at times discussed as the system 100, processor 142, detection engine 144, exception listener module 152, multi-layer detection module 154, asynchronous learning module 156, or components of any of thereof performing steps, any suitable system or components of the system may perform one or more steps of the method 300. For example, one or more steps of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 302-314.

The method 300 begins at step 302 where the detection engine 144 (e.g., via the exception listener module 152) receives the communication data 158 that comprises a plurality of messages 160 that are being transmitted between a plurality of servers 130 in a distributed network 116. For example, the exception listener module 152 may receive the communication data 158 from the exception monitoring modules 132 that are installed and stored in the plurality of servers 130, similar to that described in FIGS. 1 and 2. The detection engine 144 may receive the communication data 158 in real-time, periodically (e.g., every five seconds, every minute, every two minutes, etc.), and/or on-demand (e.g., triggered when receipt of a request 104 is detected). The communication data 152 may include a user request 104 to perform a task, such as accessing an account 124, and messages 160 to perform a task flow 112 to accomplish the task by the servers 130. The detection engine 144 may execute the exception listener module 152 to receive the communication data 158.

At step 304, the exception listener module 152 receives communication acknowledgement data 162 that is associated with the communication data 158. In one example, the exception listener module 152 may receive the communication acknowledgement data 162 in parallel with the communication data 152. Thus, the communication data 158 may further include the communication acknowledgement data 162. The communication acknowledgement data 162 may include acknowledgement data 164 that indicates whether each message 160 is being received by a respective server 130, similar to that described in FIGS. 1 and 2.

At step 306, the detection engine 144 (e.g., via the exception listener module 152 and/or the multi-layer detection module 154) determines whether any server 130 from among the plurality of servers 130 reports an exception error 106. In this process, the detection engine 144 (e.g., via the exception listener module 152 and/or the multi-layer detection module 154) determines whether each message 160 is received by a respective server 130 based on the communication acknowledgement data 162. For example, the exception listener module 152 may determine that a server 130 reported an exception error 106 in response to determining that the acknowledgement data 164 indicates that a first server 130 did not receive a particular message 160 from a second server 130, and that the second server 130 did not send the particular message 160. In this example, the exception listener module 152 determines that the server 130 reported the exception error 106 because the server 130 did not receive a message 160 as expected according to the task flow 112, similar to that described in FIGS. 1 and 2. For example, the detection engine 144 may determine, from a first acknowledgement data 164, that a second server 130 has received a first message 160 from a first server 130. In another example, the detection engine 144 may determine, from a second acknowledgement data 164, that the second server 130 has reported an exception error 106 that indicates the second server 130 did not receive the second message 160 from the third server 130, and that the third server 130 did not send the second message 160 to the second server 130. If the detection engine 144 determines that at least one server 130 reports an exception error 106, method 300 proceeds to step 308. Otherwise, method 300 terminates.

At step 308, the detection engine 144 (e.g., via the multi-layer detection module 154) identifies one or more servers 130 that are directly interacting with the server 130 that reported the exception error 106. For example, the detection engine 144 identifies one or more servers 130 that send and/or receive messages 160 to and/or from the server 130 that reported the exception error 106.

At step 310, the detection engine 144 (e.g., via the multi-layer detection module 154) identifies one or more failed message 160 that is not received by a respective server 130 from among the one or more servers 130. In this process, the multi-layer detection module 154 executes query statements to identify the successful and failed messages 160, similar to that described in FIGS. 1 and 2. The failed messages 160 may be referred to the messages 160 that were not sent and/or received.

At step 312, the detection engine 144 identifies a particular server 130 from among the one or more servers 130 that is associated with the earliest failed message 160. For example, the detection engine 144 may generate the communication matrix 166, and identify the particular server 130 that is associated with the earliest failed message 160, similar to that described in FIGS. 1 and 2.

At step 314, the detection engine 144 determines that the particular server 130 is associated with a root cause 108 of the exception error 106, similar to that described in FIGS. 1 and 2.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for detecting a root cause of an exception error in a distributed network, comprising:
a processor configured to:
receive communication data that comprises a plurality of messages being transmitted between a plurality of servers in a distributed network, wherein the plurality of servers comprises a first server, a second server, and a third server;
receive communication acknowledgement data that indicates whether each message from among the plurality of messages is being received by a respective server from among the plurality of servers, wherein:
the communication acknowledgement data comprises:
a first acknowledgement data that indicates whether the second server received a first message from the first server, and
a second acknowledgement data that indicates whether the second server received a second message from the third server;
determine whether each message from among the plurality of messages is received by a respective server from among the plurality of servers based at least in part upon the communication acknowledgement data;
determine, from the first acknowledgement data, that the second server has received the first message from the first server;
determine, from the second acknowledgement data, that the second server has reported an exception error that indicates the second server did not receive the second message from the third server, and that the third server did not send the second message to the second server; and
determine that the third server is associated with the root cause of the exception error in response to determining that the third server did not send the second message to the second server; and
a memory, operably coupled with the processor, and operable to store the communication data and the communication acknowledgement data;
wherein:
the plurality of servers further comprises a fourth server;
the communication acknowledgement data further comprises a third acknowledgement data that indicates whether the third server received a third message from the fourth server;
the second acknowledgement data is associated with a first timestamp;
the third acknowledgement data is associated with a second timestamp; and
the processor is further configured to:
determine, from the communication acknowledgement data, that the third server has not received the third message from the fourth server;
determine whether the second timestamp is before the first timestamp;
in response to determining that the second timestamp is before the first timestamp, determine that the fourth server is associated with the root cause of the exception error.

2. The system of claim 1, wherein the processor is further configured to determine that the second server is not associated with the root cause of the exception error in response to determining that the second server has received the first message from the first server.

3. The system of claim 1, wherein the receiving the communication data is in response to the first server receiving a request to perform a task, wherein the task comprises logging into an account, accessing an account, or creating an account.

4. The system of claim 1, further comprising:
the first server configured to send the first message to the second server;
the second server configured to receive the first message from the first server, and the second message from the third server; and
the third server configured to send the second message to the second server.

5. The system of claim 1, wherein the processor is configured to, in response to determining that the first timestamp is before the second timestamp, determine that the third server is associated with the root cause of the exception error.

6. The system of claim 1, wherein:
the determining, from the first acknowledgement data, that the second server has received the first message from the first server, comprises determining that the first acknowledgement data is represented by a logic number "1", and
the determining, from the second acknowledgement data, that the second server has reported the exception error that indicates the second server did not receive the second message from the third server, comprises determining that the second acknowledgement data is represented by a logic number "0".

7. A method for detecting a root cause of an exception error in a distributed network, comprising:
receiving communication data that comprises a plurality of messages being transmitted between a plurality of servers in a distributed network, wherein the plurality of servers comprises a first server, a second server, and a third server;
receiving communication acknowledgement data that indicates whether each message from among the plurality of messages is being received by a respective server from among the plurality of servers, wherein:

the communication acknowledgement data comprises:
 a first acknowledgement data that indicates whether the second server received a first message from the first server, and
 a second acknowledgement data that indicates whether the second server received a second message from the third server;
determining whether each message from among the plurality of messages is received by a respective server from among the plurality of servers based at least in part upon the communication acknowledgement data;
determining, from the first acknowledgement data, that the second server has received the first message from the first server;
determining, from the second acknowledgement data, that the second server has reported an exception error that indicates the second server did not receive the second message from the third server, and that the third server did not send the second message to the second server; and
determining that the third server is associated with the root cause of the exception error in response to determining that the third server did not send the second message to the second server;
wherein:
 the plurality of servers further comprises a fourth server;
 the communication acknowledgement data further comprises a third acknowledgement data that indicates whether the third server received a third message from the fourth server;
 the second acknowledgement data is associated with a first timestamp;
 the third acknowledgement data is associated with a second timestamp; and
 the processor is further configured to:
  determine, from the communication acknowledgement data, that the third server has not received the third message from the fourth server;
  determine whether the second timestamp is before the first timestamp;
 in response to determining that the second timestamp is before the first timestamp, determine that the fourth server is associated with the root cause of the exception error.

8. The method of claim 7, further comprising determining that the second server is not associated with the root cause of the exception error in response to determining that the second server has received the first message from the first server.

9. The method of claim 7, wherein the receiving the communication data is in response to the first server receiving a request to perform a task, wherein the task comprises logging into an account, accessing an account, or creating an account.

10. The method of claim 7, wherein:
the first server is configured to send the first message to the second server;
the second server is configured to receive the first message from the first server, and the second message from the third server; and
the third server is configured to send the second message to the second server.

11. The method of claim 7, further comprising, in response to determining that the first timestamp is before the second timestamp, determining that the third server is associated with the root cause of the exception error.

12. The method of claim 7, wherein:
the determining, from the first acknowledgement data, that the second server has received the first message from the first server, comprises determining that the first acknowledgement data is represented by a logic number "1", and
the determining, from the second acknowledgement data, that the second server has reported the exception error that indicates the second server did not receive the second message from the third server, comprises determining that the second acknowledgement data is represented by a logic number "0".

13. A computer program comprising executable instructions stored in a non-transitory computer-readable medium that when executed by a processor causes the processor to:
receive communication data that comprises a plurality of messages being transmitted between a plurality of servers in a distributed network, wherein the plurality of servers comprises a first server, a second server, and a third server;
receive communication acknowledgement data that indicates whether each message from among the plurality of messages is being received by a respective server from among the plurality of servers, wherein:
 the communication acknowledgement data comprises:
  a first acknowledgement data that indicates whether the second server received a first message from the first server, and
  a second acknowledgement data that indicates whether the second server received a second message from the third server;
determine whether each message from among the plurality of messages is received by a respective server from among the plurality of servers based at least in part upon the communication acknowledgement data;
determine, from the first acknowledgement data, that the second server has received the first message from the first server;
determine, from the second acknowledgement data, that the second server has reported an exception error that indicates the second server did not receive the second message from the third server, and that the third server did not send the second message to the second server; and
determine that the third server is associated with the root cause of the exception error in response to determining that the third server did not send the second message to the second server;
wherein:
 the plurality of servers further comprises a fourth server;
 the communication acknowledgement data further comprises a third acknowledgement data that indicates whether the third server received a third message from the fourth server;
 the second acknowledgement data is associated with a first timestamp;
 the third acknowledgement data is associated with a second timestamp; and
 the processor is further configured to:
  determine, from the communication acknowledgement data, that the third server has not received the third message from the fourth server;
  determine whether the second timestamp is before the first timestamp;

in response to determining that the second timestamp is before the first timestamp, determine that the fourth server is associated with the root cause of the exception error.

14. The computer program of claim 13, wherein the instructions when executed by the processor, further cause the processor to determine that the second server is not associated with the root cause of the exception error in response to determining that the second server has received the first message from the first server.

15. The computer program of claim 13, wherein the receiving the communication data is in response to the first server receiving a request to perform a task, wherein the task comprises logging into an account, accessing an account, or creating an account.

16. The computer program of claim 13, wherein:
the first server is configured to send the first message to the second server;
the second server is configured to receive the first message from the first server, and the second message from the third server; and
the third server is configured to send the second message to the second server.

17. The computer program of claim 13, wherein the processor is configured to, in response to determining that the first timestamp is before the second timestamp, determine that the third server is associated with the root cause of the exception error.

\* \* \* \* \*